US012592911B2

(12) United States Patent　　　　　(10) Patent No.: US 12,592,911 B2
Kimura　　　　　　　　　　　　　　　　(45) Date of Patent: Mar. 31, 2026

---

(54) SECURE RELAY DEVICE AND DATA TRANSMISSION RECEPTION SYSTEM

(71) Applicant: DENSO CORPORATION, Kariya-city (JP)

(72) Inventor: Sadahiro Kimura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 48 days.

(21) Appl. No.: 18/825,239

(22) Filed: Sep. 5, 2024

(65) Prior Publication Data

US 2024/0430237 A1　　　Dec. 26, 2024

Related U.S. Application Data

(63) Continuation of application No. PCT/JP2023/006179, filed on Feb. 21, 2023.

(30) Foreign Application Priority Data

Mar. 31, 2022　　(JP) ................................. 2022-058317

(51) Int. Cl.
　　*H04L 9/40*　　　　　(2022.01)
(52) U.S. Cl.
　　CPC ........ *H04L 63/0272* (2013.01); *H04L 63/029* (2013.01)
(58) Field of Classification Search
　　CPC ........................... H04L 63/0272; H04L 63/029
　　See application file for complete search history.

(56) References Cited

U.S. PATENT DOCUMENTS

| | | | | |
|---|---|---|---|---|
| 6,640,251 B1* | 10/2003 | Wiget | ................... | H04L 12/185 709/228 |
| 10,511,590 B1* | 12/2019 | Bosch | ..................... | H04L 63/20 |
| 2002/0188839 A1* | 12/2002 | Noehring | ................ | H04L 69/22 713/153 |
| 2006/0094371 A1* | 5/2006 | Nguyen | ............... | H04B 17/354 455/67.13 |
| 2011/0040968 A1* | 2/2011 | Liu | ..................... | H04L 61/5038 713/162 |
| 2020/0236114 A1* | 7/2020 | Patil | ..................... | H04L 63/029 |
| 2021/0243111 A1* | 8/2021 | Dutta | ..................... | H04L 45/24 |
| 2022/0248229 A1* | 8/2022 | Bharathi Somashekar | ................ | H04L 63/205 |

FOREIGN PATENT DOCUMENTS

JP　　　　　2016-5196 A　　　1/2016

* cited by examiner

*Primary Examiner* — Vance M Little
(74) *Attorney, Agent, or Firm* — Posz Law Group, PLC

(57)　　　　　　　ABSTRACT

A secure relay device is connected to a terminal device and configures a termination point of a TLS tunnel in a VPN network. The secure relay device determines whether a destination IP address of reception data, which is received from a LAN, is same as an IP address of the LAN. When the reception data is destined to a different network address from the IP address of the LAN, the secure relay device selects the TLS tunnel established between a termination point corresponding to the different network address and a transmission source of the reception data. When the reception data is destined to a same network address as the IP address of the LAN, the secure relay device selects the TLS tunnel established between a termination point corresponding to a destination MAC addresses of the reception data and the transmission source of the reception data.

6 Claims, 6 Drawing Sheets

FIG. 4

|  | LOCAL TERMINAL DEVICE | LOCAL SECURE RELAY DEVICE | REMOTE SECURE RELAY DEVICE | REMOTE TERMINAL DEVICE |
|---|---|---|---|---|
| S1 |  | STARTUP |  |  |
| S2 |  | ESTABLISH TLS TUNNEL |  |  |
| S3 | STARTUP |  |  |  |
| S4 | GENERATE PACKET, TRANSMIT ARP REQUEST |  |  |  |
| S5 |  | TRANSMIT ARP RESPONSE |  |  |
| S6 | RECEIVE ARP RESPONSE, TRANSMIT PACKET |  |  |  |
| S7 |  | SELECT TLS TUNNEL, TRANSMIT PACKET |  |  |
| S8 |  |  | RECEIVE PACKET FROM TLS TUNNEL, TRANSMIT PACKET |  |
| S9 |  |  |  | RECEIVE PACKET |

FIG. 5

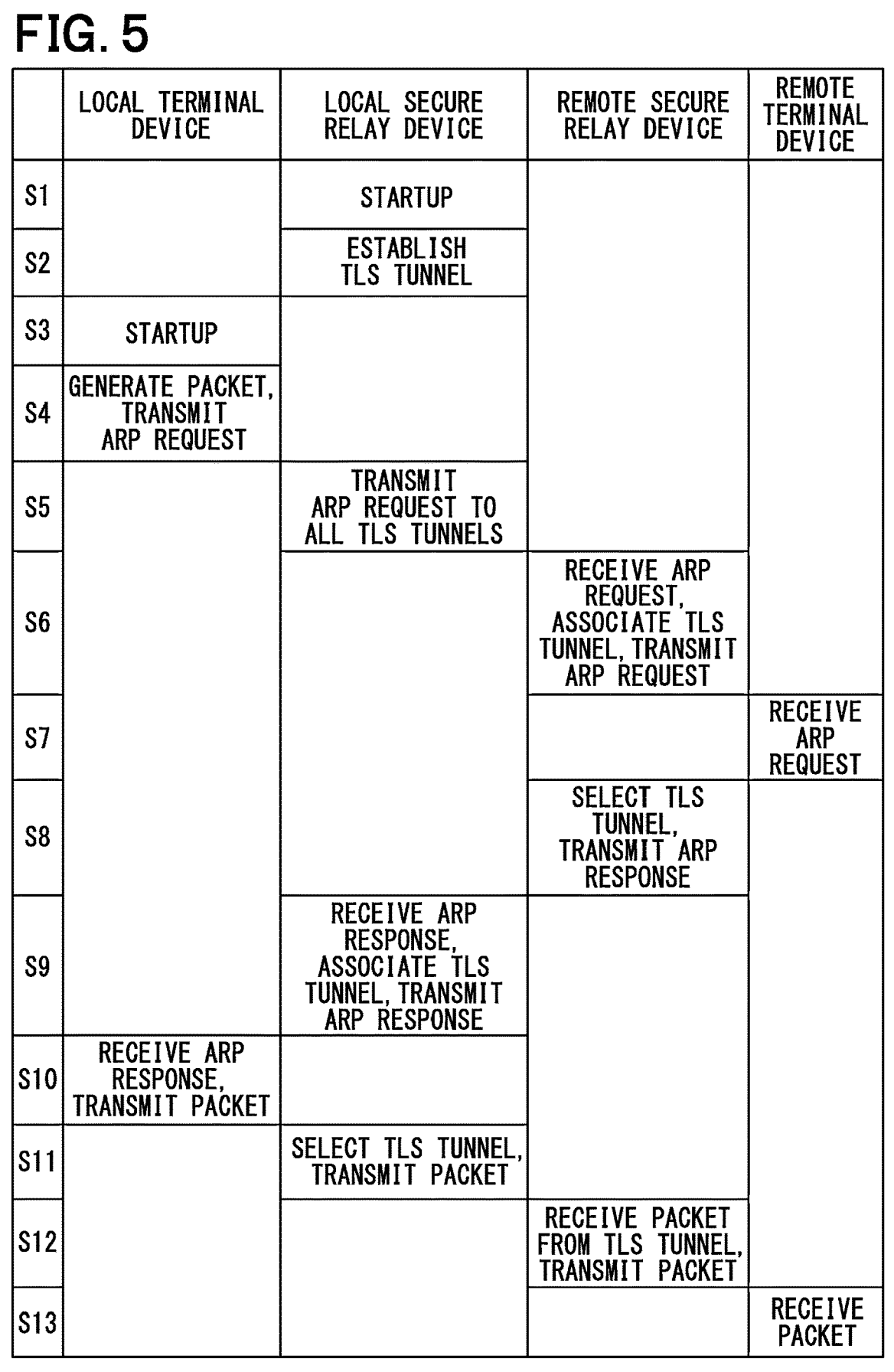

| | LOCAL TERMINAL DEVICE | LOCAL SECURE RELAY DEVICE | REMOTE SECURE RELAY DEVICE | REMOTE TERMINAL DEVICE |
|---|---|---|---|---|
| S1 | | STARTUP | | |
| S2 | | ESTABLISH TLS TUNNEL | | |
| S3 | STARTUP | | | |
| S4 | GENERATE PACKET, TRANSMIT ARP REQUEST | | | |
| S5 | | TRANSMIT ARP REQUEST TO ALL TLS TUNNELS | | |
| S6 | | | RECEIVE ARP REQUEST, ASSOCIATE TLS TUNNEL, TRANSMIT ARP REQUEST | |
| S7 | | | | RECEIVE ARP REQUEST |
| S8 | | | SELECT TLS TUNNEL, TRANSMIT ARP RESPONSE | |
| S9 | | RECEIVE ARP RESPONSE, ASSOCIATE TLS TUNNEL, TRANSMIT ARP RESPONSE | | |
| S10 | RECEIVE ARP RESPONSE, TRANSMIT PACKET | | | |
| S11 | | SELECT TLS TUNNEL, TRANSMIT PACKET | | |
| S12 | | | RECEIVE PACKET FROM TLS TUNNEL, TRANSMIT PACKET | |
| S13 | | | | RECEIVE PACKET |

SECURE RELAY DEVICE AND DATA TRANSMISSION RECEPTION SYSTEM

CROSS REFERENCE TO RELATED APPLICATIONS

The present application is a continuation application of International Patent Application No. PCT/JP2023/006179 filed on Feb. 21, 2023, which designated the U.S. and claims the benefit of priority from Japanese Patent Application No. 2022-058317 filed on Mar. 31, 2022. The entire disclosures of all of the above applications are incorporated herein by reference.

TECHNICAL FIELD

The present disclosure relates to a secure relay device and a data transmission reception system.

BACKGROUND

Conventionally, a Virtual Private Network (VPN) has been used for transmitting and receiving data using a network such as the Internet, and an encryption technique such as Transport Layer Security (TLS) is used for the VPN.

SUMMARY

The present disclosure provides a secure relay device. The secure relay device is connected to a terminal device, and configures a termination point of a TLS tunnel in a VPN network, which performs data communication using a TLS tunnel. The secure relay device determines whether a destination IP address of reception data, which is received from a LAN, is same as an IP address of the LAN for determining a destination TLS tunnel to which the reception data is to be transmitted. When the reception data is destined to a different network address from the IP address of the LAN, the secure relay device executes a first process of selecting, as the destination TLS tunnel, the TLS tunnel established between a termination point corresponding to the different network address and a transmission source of the reception data. When the reception data is destined to a same network address as the IP address of the LAN, the secure relay device executes a second process of selecting, as the destination TLS tunnel, the TLS tunnel established between a termination point corresponding to a destination MAC addresses of the reception data and the transmission source of the reception data.

BRIEF DESCRIPTION OF DRAWINGS

Objects, features and advantages of the present disclosure will become apparent from the following detailed description made with reference to the accompanying drawings. In the drawings:

FIG. 4 is a schematic diagram showing a flow of an L3 operation according to an embodiment;

FIG. 5 is a schematic diagram showing a flow of an L2 operation according to an embodiment.

DETAILED DESCRIPTION

Figure 1:
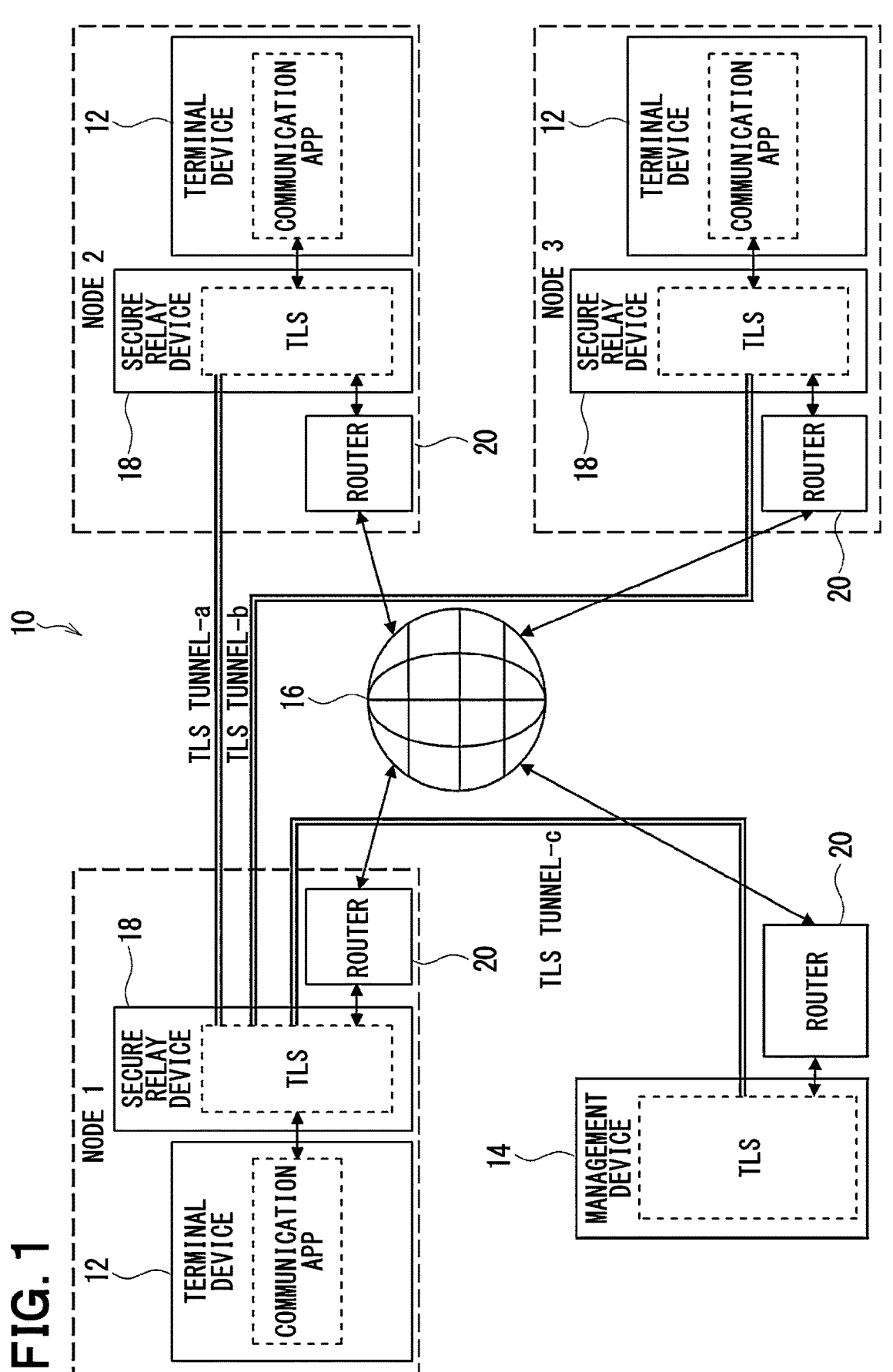
FIG. 1 is a schematic diagram illustrating a data transmission reception system according to an embodiment.

Before describing embodiments of the present disclosure, a related art will be described. In a related art, a tunnel connection device includes an SSL-VPN terminal having a network application program such as a web browser or a mail client, and the SSL-VPN terminal includes a TCP client function unit. This TCP client function unit establishes a tunnel with a TLS tunnel termination function unit of an SSL-VPN gateway to which an application server is connected, and performs tunnel communication (encapsulation communication).

Usually, a VPN is implemented in software manner in a personal computer or the like, and requires a large amount of CPU capacity and consumes a large amount of electric power. For this reason, the VPN connection may become unstable in a device with insufficient CPU capacity. In addition, since the VPN consumes a lot of electric power, it is difficult to apply them in an embedded device, such as an IoT device.

Usually, a L2 (Layer 2) switch or a L3 (Layer 3) switch may be used to connect networks, and it is necessary to select or set an appropriate switch depending on the device or network that transmits and receives data. For this reason, different network configurations cannot be mixed together, and restrictions may be imposed on network address settings.

According to an aspect of the present disclosure, a secure relay device is connected to a terminal device. The secure relay device configures a termination point of a TLS tunnel in a VPN network, which performs data communication using a TLS tunnel. The secure relay device determines whether a destination IP address of reception data, which is received from a LAN, is same as an IP address of the LAN for determining a destination TLS tunnel to which the reception data is to be transmitted. When the reception data is destined to a different network address from the IP address of the LAN, the secure relay device executes a first process of selecting, as the destination TLS tunnel, the TLS tunnel established between a termination point corresponding to the different network address and a transmission source of the reception data. When the reception data is destined to a same network address as the IP address of the LAN, the secure relay device executes a second process of selecting, as the destination TLS tunnel, the TLS tunnel established between a termination point corresponding to a destination MAC addresses of the reception data and the transmission source of the reception data.

According to an aspect of the present disclosure, the secure relay device determines, in the second process, the destination TLS tunnel by searching a table, which includes entries each having an identifier of the termination point associated with the destination MAC address.

According to an aspect of the present disclosure, in the secure relay device updates contents of the entries included in the table based on a MAC address of data transmitted from the termination point corresponding to the destination MAC address.

According to an aspect of the present disclosure, the secure relay device selects, as the destination TLS tunnel, the TLS tunnel of the termination point having the same network address as the IP address of the LAN when transmitting the reception data to a destination that is not included in the table as the entry or when the destination MAC address is a broadcast address.

According to an aspect of the present disclosure, the secure relay device is configured by a hardware circuit.

According to an aspect of the present disclosure, a data transmission reception system includes multiple secure relay devices. Each secure relay device is connected to the corresponding terminal device. One of the multiple secure relay devices establishes the TLS tunnel with another one of the multiple secure relay devices and uses the established TLS tunnel to perform data transmission and data reception between one terminal device and another terminal device.

The present disclosure can enable a stable VPN connection regardless of the CPU capacity of the terminal device, and can improve a flexibility in setting of network addresses.

The following will describe embodiments of the present disclosure with reference to the drawings. The embodiments described below show an example of the present disclosure, and the present disclosure is not limited to the specific configuration described below. In an implementation of the present disclosure, a specific configuration according an embodiment may be adopted as appropriate.

FIG. 1 is a schematic diagram of a data transmission reception system 10 according to the present embodiment. In the data transmission reception system 10 of the present embodiment, for example, multiple terminal devices 12 and one or more management devices 14 transmit and receive data via the Internet 16. In the following description, data to be transmitted and received will be described as packets.

For example, the terminal device 12 may be an IoT (Internet of Things) device, and does not have a large CPU capacity. The terminal device 12 is connected to a secure relay device 18, which is a hardware device. The secure relay device 18 is connected to a router 20, thereby enabling a connection to the Internet 16. As an example, the terminal device 12 transmits and receives packets via the secure relay device 18 using a communication application.

The secure relay device 18 is connected to the terminal device 12, and configures a TLS tunnel termination point (hereinafter referred to as a "TLS termination point") in a VPN network using a TLS tunnel. That is, the secure relay device 18 establishes a TLS tunnel between another secure relay device 18 connected to another terminal device 12, thereby enabling an address space outside the TLS termination point as a VPN address space.

In the data transmission reception system 10 of the present embodiment, one or more terminal devices 12 are connected to one secure relay device 18. One or more secure relay devices 18 are connected to one router 20. In the following description, the set including the terminal device 12, the secure relay device 18, and the router 20 is also referred to as a node.

The management device 14 is, for example, a server. The management device 14 is equipped with a function of configuring a TLS tunnel and is connectable to the Internet 16 via the router 20.

In FIG. 1, the TLS tunnels a to c are schematic representations of TLS tunnels established between node 1 and nodes 2, between node 1 and node 3, and between node 1 and the management device 14. TLS tunnels are also established between the node 2 and the node 3, between the node 2 and the management device 14, and between the node 3 and the management device 14.

As will be described later in detail, the secure relay device 18 of the present embodiment enables packets to be transmitted and received between nodes even though the L2 configuration is mixed with the L3 configuration.

Figure 2:
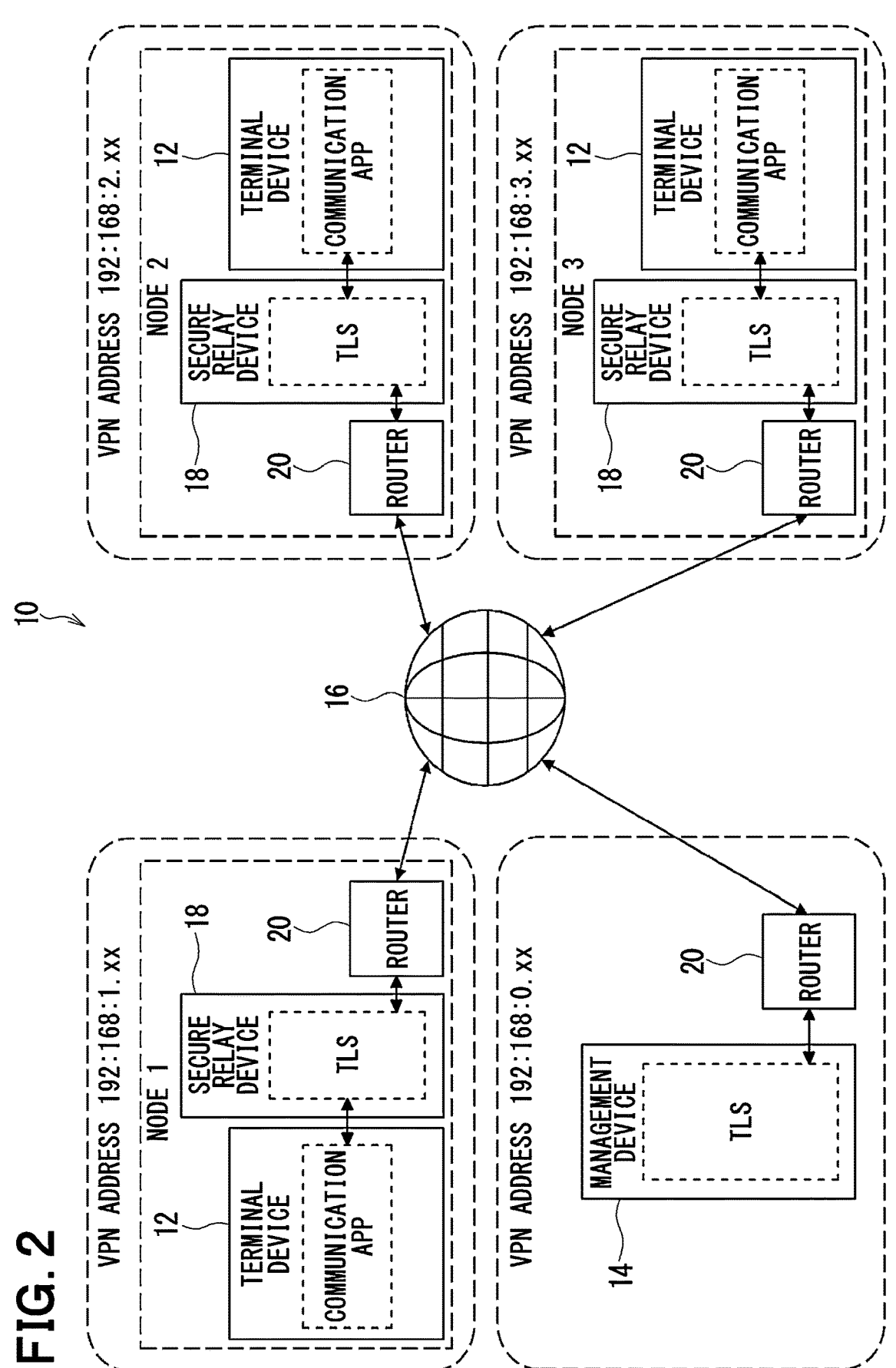
FIG. 2 is a diagram illustrating an L3 configuration according to an embodiment.

FIG. 2 is a conceptual diagram showing the L3 configuration. In the L3 configuration, different VPN addresses (different IP addresses or subnet addresses) are set for the nodes 1 to 3 and the management device 14. In the L3 configuration, an L3 operation, which is a packet transmission operation, selects a destination TLS tunnel by routing based on the IP address of the destination to which the packet is to be transmitted.

Figure 3:
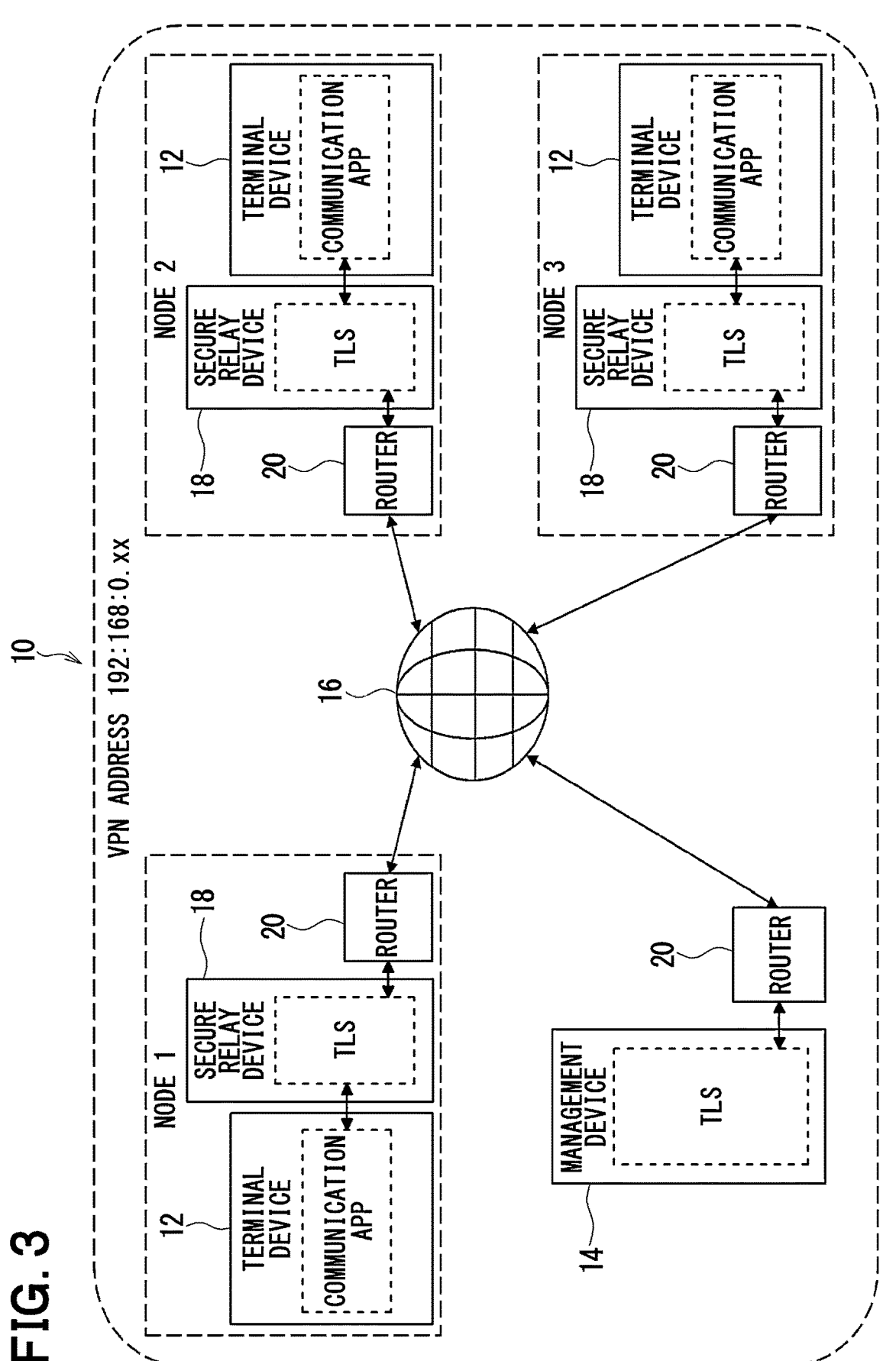
FIG. 3 is a diagram showing an L2 configuration according to an embodiment.

FIG. 3 is a conceptual diagram showing the L2 configuration. In the L2 configuration, the same VPN address is set for the nodes 1 to 3 and the management device 14. In the L2 configuration, an L2 operation, which is a packet transmission operation, selects a destination TLS tunnel based on the MAC address of the destination to which the packet is to be transmitted. To perform the L2 operation, the secure relay device 18 stores a table including entries each associated with a MAC address of the terminal device 12 and an identifier of the termination point of the TLS tunnel (hereinafter referred to as a "TLS identifier").

FIG. 4 is a schematic diagram showing an example of the flow of operation executed by the data transmission reception system 10 in the L3 configuration (hereinafter referred to as "L3 operation"). In FIG. 4, the term local is used to indicate the transmission source of packet, and the term remote is used to indicate the destination of packet.

In the L3 configuration, as described above, different VPN addresses (a different subnet address in the example of FIG. 4) are assigned to the nodes within the VPN address space. The secure relay device 18 serves as a default route from the terminal device 12. In the L3 operation, the secure relay device 18 determines the TLS tunnel to which the packet is to be sent by a routing operation.

In step S1, the secure relay device 18 on local side (hereinafter referred to as "local relay device") is started up.

In step S2, the local relay device establishes TLS tunnels with the secure relay device 18 on remote side (hereinafter referred to as remote relay device) and the management device 14 based on the settings defined in advance.

In step S3, the terminal device 12 on local side (hereinafter referred to as "local terminal device") is started up.

In step S4, the local terminal device generates a packet to be transmitted to the terminal device 12 on remote side (hereinafter referred to as "remote terminal device"). Since the address of remote terminal device 12 is outside the subnetwork of the local terminal device, the local terminal device sets the local relay device as the Next Hop IP. Then, the local terminal device transmits an ARP (Address Resolution Protocol) request to the local relay device.

In step S5, when the local relay device receives the ARP request, the local relay device generates and transmits an ARP response to the ARP request.

In step S6, the local terminal device receives the ARP response. Then, the local terminal device transmits the generated packet to the local relay device.

In step S7, the local relay device receives the packet. Then, the local relay device performs a routing process based on the destination IP address (Dest IP) of the packet, thereby selecting a destination TLS tunnel, and then transmits the packet to the selected TLS tunnel.

In step S8, the remote relay device receives the packet from the TLS tunnel and transmits the reception packet to the remote terminal device based on the Dest IP.

In step S9, the remote terminal device receives the packet from the remote relay device.

FIG. 5 is a schematic diagram showing an example of the flow of operation executed by the data transmission reception system 10 in the L2 configuration (hereinafter referred to as "L2 operation").

In the L2 configuration, as described above, the same VPN address (subnet address in the example of FIG. 5) is assigned to all of the nodes within the VPN address space. The secure relay device 18 is not recognized by the terminal device 12. In the L2 operation, the secure relay device 18 determines the TLS tunnel to which the packet is to be transmitted based on the MAC address of the destination.

In step S1, the local relay device is started up.

In step S2, the local relay device establishes TLS tunnels with the remote relay device and the management device 14 based on the settings defined in advance.

In step S3, the local terminal device is started up.

In step S4, the local terminal device generates a packet to be transmitted to the remote terminal device. Since the address of the remote terminal device is within the subnetwork of the local terminal device, the local terminal device sets the remote terminal device as the Next Hop IP. Then, the local terminal device broadcasts an ARP request to the remote terminal device.

In step S5, the local relay device receives the ARP request from the local terminal device. Since the ARP request is broadcasted, the local relay device transmits a packet indicating the ARP request (hereinafter referred to as "ARP request packet") to all of the TLS tunnels.

In step S6, the remote relay device receives the ARP request packet from the TLS tunnel. The remote relay device associates the MAC address in the ARP request packet with the TLS tunnel. Then, the remote relay device broadcasts the ARP request packet to the remote terminal device.

In step S7, the remote terminal device receives the ARP request packet, generates an ARP response, and transmits the ARP response.

In step S8, the remote relay device receives the ARP response. Then, the remote relay device selects a destination TLS tunnel based on the destination MAC address included in the ARP response, and transmits the ARP response packet to the selected TLS tunnel.

In step S9, the local relay device receives the ARP response packet from the TLS tunnel. The local relay device associates the MAC address included in the ARP response packet with the TLS tunnel. Then, the local relay device transmits the ARP response packet to the local terminal device.

In step S10, the local terminal device receives the ARP response packet. Then, the local terminal device transmits the generated packet to the local relay device.

In step S11, the local relay device receives the packet. The local relay device selects a destination TLS tunnel from the destination MAC address included in the reception packet, and transmits the packet to the selected TLS tunnel.

In step S12, the remote relay device receives the packet from the TLS tunnel and transmits the packet to the remote terminal device.

In step 13, the remote terminal device receives the packet from the remote relay device.

Figure 6:
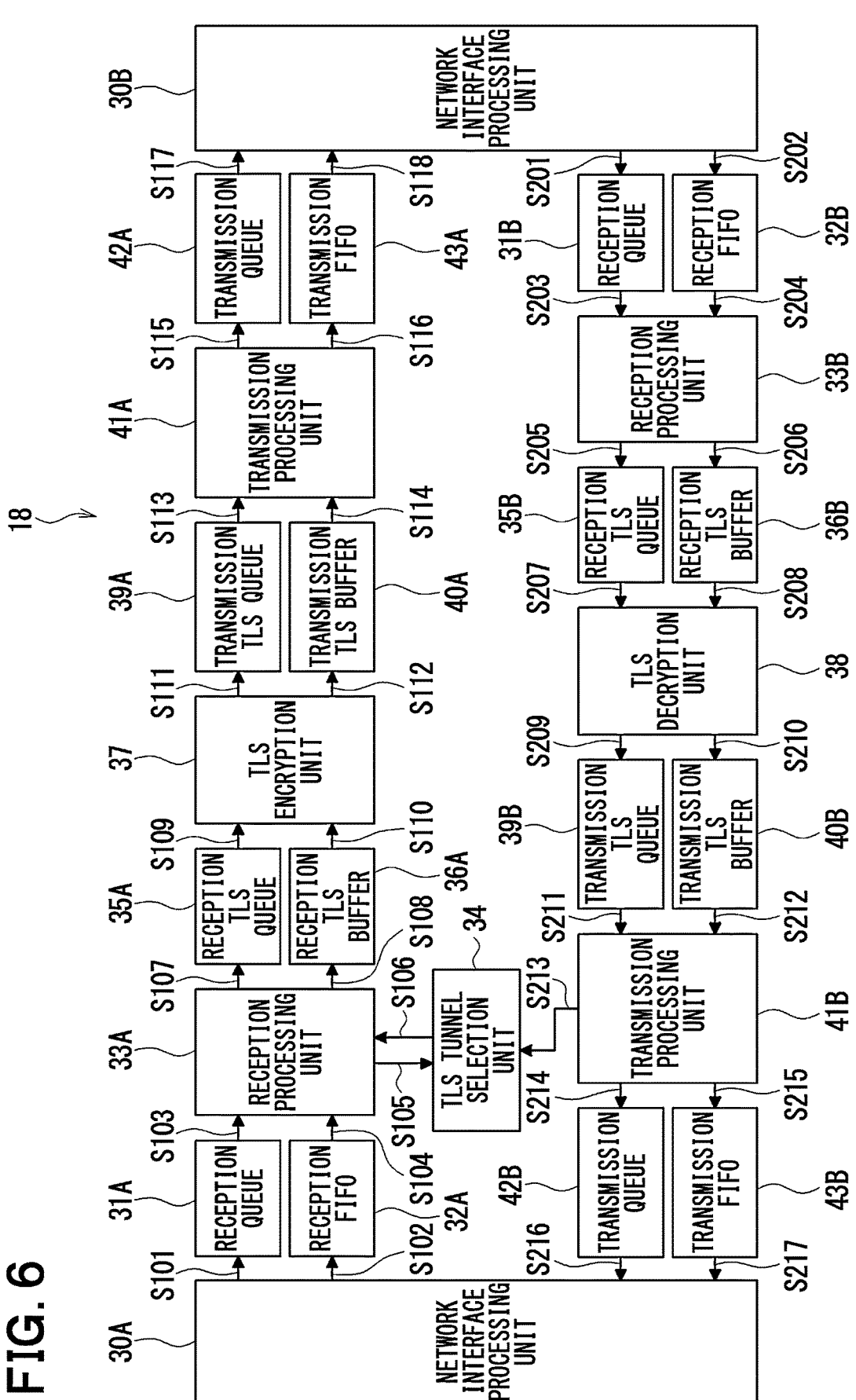
FIG. 6 is a block diagram showing a hardware configuration of a secure relay device according to an embodiment.

FIG. 6 is a block diagram showing a hardware configuration of the secure relay device 18 of the present embodiment. The process performed by the secure relay device 18 will be described with reference to FIG. 6.

The secure relay device 18 includes a network interface processing unit 30A, a reception queue 31A, a reception FIFO 32A, a c 33A, a TLS tunnel selection unit 34, a reception TLS queue 35A, a reception TLS buffer 36A, a TLS encryption unit 37, a transmission TLS queue 39A, a transmission TLS buffer 40A, a transmission processing unit 41A, a transmission queue 42A, and a transmission FIFO 43A.

The secure relay device 18 also includes a network interface processing unit 30B, a reception queue 31B, a reception FIFO 32B, a reception processing unit 33B, a reception TLS queue 35B, a reception TLS buffer 36B, a TLS decryption unit 38, a transmission TLS queue 39B, a transmission TLS buffer 40B, a transmission processing unit 41B, a transmission queue 42B, and a transmission FIFO 43B.

The network interface processing unit 30A is connected to a LAN interface of the secure relay device 18, and has a function of transmitting and receiving packets to and from other devices connected to the LAN. For this reason, the network interface processing unit 30A has a known Ethernet-PHY function and a known Ethernet-MAC function.

In response to receiving a packet to be transmitted from a directly connected terminal device 12 to another terminal device 12, the network interface processing unit 30A writes the reception packet, which is referred to as reception packet hereinafter, into the reception FIFO 32A and enqueues information about the reception packet into the reception queue 31A. For this purpose, the network interface processing unit 30A outputs a reception queue setting signal S101 to the reception queue 31A, and outputs a reception packet data signal S102 to the reception FIFO 32A.

The reception queue setting signal S101 is a signal for enqueuing the packet length of the reception packet in the reception queue 31A. The reception queue setting signal S101 is output to the reception queue 31A when the transfer of the reception packet data to the reception FIFO 32A is completed.

The reception packet data signal S102 is a signal for transferring the reception packet data to the reception FIFO 32A.

The reception queue 31A stores information about the reception packet stored in the reception FIFO 32A. The stored information includes the packet length of the reception packet. The entry located at front of the reception queue 31A is output to the reception processing unit 33A. When the reception processing unit 33A has completed current reception of the packet, the reception processing unit 33A reads the reception queue 31A to acquire contents of the next entry thereby the next entry being output to the reception processing unit 33A. For this purpose, the reception queue 31A outputs a reception queue output signal S103 to the reception processing unit 33A.

The reception queue output signal S103 is a signal indicating the front entry enqueued in the reception queue 31A. The reception queue output signal S103 indicates the packet length of reception packet that the reception processing unit 33A should process when the reception packet is stored in the reception FIFO 32A. When the reception processing unit 33A reads out the reception queue output signal S103, the reception queue 31A outputs the next contents of queue as the next reception queue output signal S103.

The reception FIFO 32A is a packet storage FIFO storing packets to be transferred to the reception processing unit 33A. The reception FIFO 32A receives packet data from the network interface processing unit 30A, and the reception packet data is read out by the reception processing unit 33A.

The reception FIFO 32A outputs a reception packet data signal S104 to the reception processing unit 33A. The reception packet data signal S104 is a signal to be read by the reception processing unit 33A in accordance with the information indicated in the reception queue output signal S103. The reception packet data signal S104 indicates the contents of reception packet data stored in the reception FIFO 32A.

The reception processing unit 33A receives the reception packet by reading the reception FIFO 32A based on the reception queue output signal S103, and performs the following reception process on the reception packet.

Before performing the following process, the reception processing unit 33A determines whether the destination IP address of the reception packet received from the LAN is the same network address as the LAN IP address of the secure relay device 18 in order to determine the TLS tunnel to which the reception packet is to be transmitted.

(Reception Process 1)

Reception process 1 is performed when the destination MAC address included in the MAC header of the reception packet is identical to the MAC address set in the LAN interface of the secure relay device 18 and the destination IP address included in the IP header of the reception packet is different from the IP address set in the LAN interface of the secure relay device 18.

The reception processing unit 33A uses the destination IP address included in the IP header of the reception packet to search a management table provided in the reception processing unit 33A and obtains the TLS identifier to be used for transmission associated with the network address.

When the subnet address of the destination IP address indicated in the IP header of the reception packet differs from the subnet address of the network to which the secure relay device 18 is directly connected, the secure relay device 18 selects the destination TLS tunnel based on the subnet address of the destination IP address. The reception process 1 is a process for carrying out the above-described L3 operation.

(Reception Process 2)

Reception process 2 is performed when the destination MAC address included in the MAC header of the reception packet is different from the MAC address set in the LAN interface of the secure relay device 18 and the destination IP address included in the IP header of the reception packet is identical to the IP address set in the LAN interface of the secure relay device 18.

In this case, the reception processing unit 33A outputs, to the TLS tunnel selection unit 34, TLS selection key information S105 indicating a search instruction using the destination MAC address of the reception packet as a search key. Then, the reception processing unit 33A obtains the TLS identifier searched for by the TLS tunnel selection unit 34 as the destination of the reception packet.

The TLS tunnel selection unit 34 includes a table (hereinafter referred to as "TLS identifier table") having entries of TLS identifiers associated with the MAC addresses of the terminal devices 12.

The TLS tunnel selection unit 34 uses the MAC address indicated by the TLS selection key information S105 as the search key, searches all entries in the TLS identifier table for an entry that matches the MAC address, and selects the TLS identifier that matches the MAC address. The value set in the selected TLS identifier is output to the reception processing unit 33A as a TLS selection search result output signal S106.

In the secure relay device 18, when the subnet address of the destination IP address of the reception packet is identical to the subnet address of the network to which the secure relay device 18 is directly connected, the TLS tunnel selection unit 34 searches the TLS identifier table to determine the TLS tunnel. The reception process 2 is a process for carrying out the above-described L2 operation.

When there is no TLS identifier corresponding to the destination MAC address in the TLS identifier table provided in the TLS tunnel selection unit 34, the reception processing unit 33A searches the management table provided in the reception processing unit 33A using the IP address set in the LAN interface of the secure relay device 18, and obtains at least one TLS identifier to be used for transmission associated with the network address (reception process 2A). In this case, multiple TLS identifiers may be used for transmission.

(Reception Process 3)

When the destination MAC address included in the MAC header of the reception packet is a broadcast address and is not addressed to the secure relay device 18, the management table provided in the reception processing unit 33A is searched using the IP address set in the LAN interface of the secure relay device 18, and at least one TLS identifier to be used for transmission associated with the network address is obtained. In this case, multiple TLS identifiers may be used for transmission.

(Reception Process 4)

When the destination MAC address included in the MAC header of the reception packet is a broadcast address destined to the secure relay device 18, or when the destination MAC address included in the MAC header of the reception packet is identical to the MAC address set in the LAN interface of the secure relay device 18 and the destination IP address included in the IP header is identical to the IP address set in the LAN interface of the secure relay device 18, the reception packet is determined to be destined to the secure relay device 18 and appropriate termination process and response process are performed.

After performing any one of the above-described reception processes 1 to 4, the reception processing unit 33A transfers the reception packet to the reception TLS buffer 36A and enqueues, in the reception TLS queue 35A, the packet length of the packet, a pointer to the reception TLS buffer 36A, and the TLS identifier of the output destination. For this purpose, the reception processing unit 33A outputs a reception TLS queue setting signal S107 to the reception TLS queue 35A, and outputs a reception TLS buffer write signal S108 to the reception TLS buffer 36A.

The reception TLS queue setting signal S107 is a signal for enqueuing information about the reception packet in the reception TLS queue 35A such that the reception processing unit 33A transfers the packet for which reception process has been completed to the TLS encryption unit 37. The information about the reception packet includes the packet length of the reception packet, the pointer to the reception TLS buffer 36A, and the TLS identifier of the output destination. The reception TLS queue setting signal S107 is output at the time after the reception packet whose reception has been completed is written into the reception TLS buffer 36A.

The reception TLS buffer write signal S108 is a signal for writing the packet data for which the reception processing unit 33A has completed the reception process, into the reception TLS buffer 36A.

The reception TLS queue 35A stores information about the reception packet that has been processed by the reception processing unit 33A and transferred to the reception TLS buffer 36A. The front entry in the reception TLS queue 35A is output to the TLS encryption unit 37. When the TLS encryption unit 37 has completed reception of the packet, the contents of the next entry is output by reading the reception TLS queue 35A. For this purpose, the reception TLS queue 35A outputs the reception TLS queue output signal S109 to the TLS encryption unit 37.

The reception TLS queue output signal S109 is a signal indicating the front entry enqueued in the reception TLS queue 35A. When the reception packet to be processed by the TLS encryption unit 37 is stored in the reception TLS buffer 36A, the packet length of the reception packet and the TLS identifier of the pointer output destination to the reception TLS buffer 36A are output as a reception TLS queue output signal S109. When the TLS encryption unit 37 reads the reception TLS queue output signal S109, the reception TLS queue 35A outputs the next contents of the queue.

The reception TLS buffer 36A is a packet storage buffer for transferring the reception packet processed by the reception processing unit 33A to the TLS encryption unit 37. The reception processing unit 33A writes the reception packet data to the reception TLS buffer 36A, and the TLS encryption unit 37 reads out the reception packet from the reception TLS buffer 36A. For this purpose, the reception TLS buffer 36 A outputs a reception TLS buffer read signal S110 to the TLS encryption unit 37.

The reception TLS buffer read signal S110 is a signal indicating the contents of reception packet data stored in the reception TLS buffer 36A, and is output when the TLS encryption unit 37 reads the data in accordance with information indicated in a reception TLS queue output signal S113.

The TLS encryption unit 37 reads out the reception packet data stored in the reception TLS buffer 36A using the information indicated by the reception TLS queue output signal S109. Then, the TLS encryption unit 37 performs the TLS encryption process using the TLS identifier of the output destination indicated by the reception TLS queue output signal S109.

The TLS encryption unit 37 then selects a TCP session identifier based on the TLS identifier, and transfers the reception packet that has been subjected to TLS encryption process to the transmission TLS buffer 40A. The TLS encryption unit 37 enqueues, in the transmission TLS queue 39A, the packet length of the reception packet, a pointer to the transmission TLS buffer 40A, and an identifier of the TCP session used for transmission. For this purpose, the TLS encryption unit 37 transmits a transmission TLS queue setting signal S111 to the transmission TLS queue 39A, and transmits a transmission TLS buffer write signal S112 to the transmission TLS buffer 40A.

The TLS encryption unit 37 transfers the packet (hereinafter referred to as a "TLS transmission packet") to which the TLS encryption process has been executed, to the transmission processing unit 41A. The transmission TLS queue setting signal S111 is a signal for enqueuing information regarding the TLS transmission packet in the transmission TLS queue 39A. The information on the TLS transmission packet includes the packet length of the TLS transmission packet, a pointer to the transmission TLS buffer 40A, and an identifier of the TCP session used for transmission. The transmission TLS queue setting signal S111 is output to the transmission TLS queue 39A when the writing of reception packet, for which TLS encryption process has been completed, into the transmission TLS buffer 40A is completed.

The transmission TLS buffer write signal S112 is a signal for writing TLS transmission packet data for which the TLS encryption unit 37 has completed TLS encryption process into the transmission TLS buffer 40A, and indicates the contents of the packet data for which TLS encryption process has been completed.

The transmission TLS queue 39A stores information about the TLS transmission packet transferred to the transmission TLS buffer 40A. The front entry of the transmission TLS queue 39A is output to the transmission processing unit 41A. When the transmission processing unit 41A has completed reception of the packet, the transmission TLS queue 39A is read out and the contents of the next entry are output. For this purpose, the transmission TLS queue 39A outputs a transmission TLS queue output signal S113 to the transmission processing unit 41A.

The transmission TLS queue output signal S113 indicates the front entry enqueued in the transmission TLS queue 39A. When the TLS transmission packet to be processed by the transmission processing unit 41A is stored in the transmission TLS buffer 40A, the packet length of the TLS transmission packet, a pointer to the transmission TLS buffer 40A, and an identifier of the TCP session to be used for transmission are output as the transmission TLS queue output signal S113. When the transmission processing unit 41A reads out the transmission TLS queue output signal S113, the transmission TLS queue 39A outputs the next contents of the queue.

The transmission TLS buffer 40A is a packet storage buffer for transferring the TLS transmission packet to the transmission processing unit 41A. The TLS transmission packet data is written to the transmission TLS buffer 40A by the TLS encryption unit 37 and is read out by the transmission processing unit 41A. For this purpose, the transmission TLS buffer 40A outputs a transmission TLS buffer read signal S114 to the transmission processing unit 41A.

The transmission TLS buffer read signal S114 is a signal indicating the contents of TLS transmission packet data stored in the transmission TLS buffer 40A by the transmission processing unit 41A, and is read out in accordance with the information indicated in the transmission TLS queue output signal S113.

The transmission processing unit 41A reads the TLS transmission packet stored in the transmission TLS buffer 40A using the information indicated by the transmission TLS queue output signal S113, and generates a TCP/IP packet with the TLS transmission packet as the payload using the identifier of the TCP session. The identifier of the TCP session is used for transmission indicated by the transmission TLS queue output signal S113.

Specifically, the transmission processing unit 41A performs, on the generated TCP/IP packet, routing process to select a Next Hop IP and MAC address resolution to generate an Ethernet frame. The transmission processing unit 41A transfers the generated Ethernet frame to the transmission FIFO 43A, transmits the frame length of the Ethernet frame to the transmission queue 42A, and enqueues the frame in the transmission queue 42A. For this purpose, the transmission processing unit 41A outputs a transmission queue setting signal S115 to the transmission queue 42A, and outputs a transmission FIFO write signal S116 to the transmission FIFO 43A.

The transmission queue setting signal S115 is a signal for enqueuing information for the transmission Ethernet frame in the transmission queue 42A so that the transmission processing unit 41A can transfer the transmission Ethernet frame that has completed packetization process using TCP/IP to the network interface processing unit 30B. The transmission queue setting signal S115 is output when the transmission Ethernet frame that has been packetized under TCP/IP and converted into the Ethernet frame has been completely written into the transmission FIFO 43A. The information of the Ethernet frame includes the frame length of the transmitted frame.

The transmission FIFO write signal S116 is a signal for writing the transmission Ethernet frame, which has been packetized and converted into the Ethernet frame by the transmission processing unit 41A, into the transmission FIFO 43A, and indicates a transmission Ethernet frame.

The transmission queue 42A stores information about the Ethernet frame transferred to the transmission FIFO 43A. The information about the Ethernet frame includes the frame length of the Ethernet frame. The front entry in the transmission queue 42A is output to the network interface processing unit 30B. When the network interface processing unit 30B has completed receiving of the Ethernet frame, the contents of the next entry are output by reading out the transmission queue 42A. For this purpose, the transmission queue 42A outputs a transmission queue output signal S117 to the network interface processing unit 30B.

The transmission queue output signal S117 indicates the front entry enqueued in the transmission queue 42A. When the Ethernet frame that is to be transmitted by the network interface processing unit 30B is stored in the transmission FIFO 43A, the transmission queue output signal S117 also includes the frame length of the Ethernet frame. When the network interface processing unit 30B reads the transmission queue output signal S117, the transmission queue 42A outputs the next contents of the queue.

The transmission FIFO 43A is a packet storage FIFO for transferring the Ethernet frame generated by the transmission processing unit 41A to the network interface processing unit 30B. The Ethernet frame is written to the transmission FIFO 43A by the transmission processing unit 41A and is read out by the network interface processing unit 30B. For this purpose, the transmission FIFO 43A outputs a transmission FIFO read signal S118 to the network interface processing unit 30B.

The transmission FIFO read signal S118 is a signal that is output when the network interface processing unit 30B reads out an Ethernet frame stored in the transmission FIFO 43A in accordance with the information indicated in the transmission queue output signal S117, and outputs the contents of the Ethernet frame data.

The network interface processing unit 30B has same functions as the network interface processing unit 30A, and is connected to a WAN interface of the secure relay device 18. The network interface processing unit 30B transmits and receives packets to and from one or more remote secure relay devices 18 connected via the Internet 16.

In transmission of the packet, the network interface processing unit 30B reads the TLS transmission packet from the transmission FIFO 43A based on information about the TLS transmission packet enqueued in the transmission queue 42A, and transmits the packet to the network via the determined TLS tunnel.

In reception of the packet, the network interface processing unit 30B writes the reception packet into the reception FIFO 32B and enqueues information about the reception packet into the reception queue 31B.

The reception queue setting signal S201 is similar to the reception queue setting signal S101, and is a signal for enqueuing the packet length of the reception packet received by the network interface processing unit 30B in the reception queue 31B.

The reception packet data signal S202 is similar to the reception packet data signal S102, and is a signal for transferring the data of reception packet received by the network interface processing unit 30B to the reception FIFO 32B.

The reception queue 31B is similar to the reception queue 31A, and stores information about the reception packet, which is received by the network interface processing unit 30B and stored in the reception FIFO 32B. Then, the reception queue 31B outputs a reception queue output signal S203, which is similar to the reception queue output signal S103, to the reception processing unit 33B.

The reception FIFO 32B is similar to the reception FIFO 32A, and is a packet storage FIFO for transferring the reception packet received by the network interface processing unit 30B to the reception processing unit 33B. Then, the reception FIFO 32B outputs a reception packet data signal S204, which is similar to the reception packet data signal S104, to the reception processing unit 33B.

The reception processing unit 33B reads the reception packet stored in the reception FIFO 32B based on the reception queue output signal S203, performs TCP/IP termination process on the reception packet, and extracts the encrypted packet stored in the TCP payload. The reception processing unit 33B transfers the extracted reception packet to the reception TLS buffer 36B, and enqueues, in the reception TLS queue 35B, the packet length of the reception packet, a pointer to the reception TLS buffer 36B, and the identifier of the TCP session used for reception. For this purpose, the reception processing unit 33B outputs a reception TLS queue setting signal S205 to the reception TLS queue 35B, and outputs a reception TLS buffer write signal S206 to the reception TLS buffer 36B.

The reception TLS queue setting signal S205 is a signal for enqueuing information for the reception packet in the reception TLS queue 35B so that the reception processing unit 33B performs reception process and transfers the reception packet stored in the payload of the TCP segment to the TLS decryption unit 38. The information about the reception packet includes the packet length of the packet, a pointer to the reception TLS buffer 36B, and an identifier of the TCP session used for receiving the packet. The reception TLS queue setting signal S205 is output when writing of the reception packet, which is extracted as a result of the reception process, into the reception TLS buffer 36B is completed.

The reception TLS buffer write signal S206 is a signal for writing the reception packet data, for which the reception processing unit 33B has completed process, into the reception TLS buffer 36B, and indicates the reception packet data for which the reception process has completed.

The reception TLS queue 35B stores information about the encrypted reception packet, which is extracted by the reception processing unit 33B and stored in the reception TLS buffer 36B. The front entry in the reception TLS queue 35B is output to the TLS decryption unit 38. When the TLS decryption unit 38 has completed reception of the packet, the reception TLS queue 35B is read out and the contents of the next entry are output. For this purpose, the reception TLS queue 35B outputs the reception TLS queue output signal S207 to the TLS decryption unit 38.

The reception TLS buffer 36B is a packet storage buffer for transferring the encrypted reception packet extracted by the reception processing unit 33B to the TLS decryption unit 38. The reception TLS buffer 36B is written by the reception processing unit 33B and is read out by the TLS decryption unit 38. For this purpose, the reception TLS buffer 36B outputs a reception TLS buffer read signal S208 to the TLS decryption unit 38.

The reception TLS queue output signal S207 is a signal indicating the front entry enqueued in the reception TLS queue 35B. When the reception packet data to be processed by the TLS decryption unit 38 is stored in the reception TLS buffer 36B, the data length of the reception packet data, a pointer to the reception TLS buffer 36B, and a TLS identifier corresponding to the input source TCP session are output as a reception TLS queue output signal S207. When the TLS decryption unit 38 reads the reception TLS queue output signal S207, the reception TLS queue 35B outputs the next contents of the queue.

The reception TLS buffer read signal S208 is a signal indicating the reception packet data stored in the reception TLS buffer 36B by the TLS decryption unit 38, and is output when the reception packet data is read in accordance with the information indicated in the reception TLS queue output signal S207.

The TLS decryption unit 38 receives the encrypted reception packet to be processed by reading the reception TLS buffer 36B based on the reception TLS queue output signal S207. The TLS decryption unit 38 selects a TLS identifier based on the identifier of the TCP session used to receive the output information of the reception TLS queue 35B. Then, the TLS decryption unit 38 performs decryption process on the encrypted reception packet using the selected TLS identifier to decrypt the packet.

The TLS decryption unit 38 transfers the decrypted packet (hereinafter referred to as "transmission packet") to the transmission TLS buffer 40B, and enqueues in the transmission TLS queue 39B the packet length of the transmission packet, a pointer to the transmission TLS buffer 40B, and a TLS identifier corresponding to the input source TCP session. For this purpose, the TLS decryption unit 38 transmits a transmission TLS queue setting signal S209 to the transmission TLS queue 39B, and outputs a transmission TLS buffer write signal S210 to the transmission TLS buffer 40B.

The transmission TLS queue setting signal S209 is a signal for enqueuing information about the transmission packet in the transmission TLS queue 39B in order to transfer the transmission packet to the transmission processing unit 41B. The information about the transmission packet includes the packet length of the transmission packet, a pointer to the transmission TLS buffer 40B, and a TLS identifier corresponding to the input source TCP session. The transmission TLS queue setting signal S209 is output when the writing of transmission packet, for which the decryption process has been completed, into the transmission TLS buffer 40B is completed.

The transmission TLS buffer write signal S210 is a signal for writing the transmission packet that has completed decryption into the transmission TLS buffer 40B, and indicates the contents of transmission packet data.

The transmission TLS queue 39B stores information about the transmission packet transferred to the transmission TLS buffer 40B. The front entry of the transmission TLS queue 39B is output to the transmission processing unit 41B. When the transmission processing unit 41B has completed receiving of the packet, the transmission TLS queue 39B is read out and the contents of next entry are output. For this purpose, the transmission TLS queue 39B outputs a transmission TLS queue output signal S211 to the transmission processing unit 41B.

The transmission TLS queue output signal S211 outputs the front entry enqueued in the transmission TLS queue 39B. When a transmission packet to be processed by the transmission processing unit 41B is stored in the transmission TLS buffer 40B, the packet length of the transmission packet, a pointer to the transmission TLS buffer 40B, and a TLS identifier corresponding to the input source TCP session are output as a transmission TLS queue output signal S211. When the transmission processing unit 41B reads out the transmission TLS queue output signal S211, the transmission TLS queue 39B outputs the next contents of the queue.

The transmission TLS buffer 40B is a packet storage buffer for transferring transmission packet to the transmission processing unit 41B. The transmission packet data is written to the transmission TLS buffer 40B by the TLS decryption unit 38, and is read out by the transmission processing unit 41B. For this purpose, the transmission TLS buffer 40B outputs a transmission TLS buffer read signal S212 to the transmission processing unit 41B.

The transmission TLS buffer read signal S212 is a signal indicating the contents of transmission packet data stored in the transmission TLS buffer 40B by the transmission processing unit 41B, and is output when reading according to the information indicated in the transmission TLS queue output signal S211 is performed.

The transmission processing unit 41B receives the transmission packet to be processed by reading the transmission TLS buffer 40B based on the transmission TLS queue output signal S211, and performs the following process.

(Transmission Process 1)

When the TLS identifier indicated in the transmission TLS queue 39B is a TLS tunnel used in communication with a terminal device 12 having an IP address different from that set in the LAN interface of the secure relay device 18, the transmission processing unit 41B changes the source MAC address included in the MAC header to the MAC address set in the LAN interface of the secure relay device 18.

(Transmission Process 2)

When the TLS identifier indicated in the transmission TLS queue 39B is a TLS tunnel used in communication with the terminal device 12 having the same IP address as that set in the LAN interface of the secure relay device 18, the source MAC address included in the MAC header of the transmission packet and the TLS identifier are output to the TLS tunnel selection unit 34, and an instruction is given to update the entry in the TLS identifier table provided in the TLS tunnel selection unit 34, which associates the MAC address with the corresponding TLS identifier. In this case, the transmission processing unit 41B outputs a TLS tunnel learning signal S213 to the TLS tunnel selection unit 34 to instruct update of the entry.

When the network address corresponding to the TLS identifier corresponding to the input source TCP session matches the subnet address of the network directly connected to the secure relay device 18, the transmission source MAC address indicated in the MAC header of the transmission packet and the TLS identifier are output as a TLS tunnel learning signal S213.

When the TLS tunnel selection unit 34 is instructed by the transmission processing unit 41B to update the TLS identifier table using the MAC address and TLS identifier according to the TLS tunnel learning signal S213, the TLS tunnel selection unit 34 searches for an entry that matches the specified MAC address and performs the following process based on the matching result.

(Update Process 1)

When an entry matching the specified MAC address exists, the value of TLS identifier of that entry is changed to the TLS identifier specified by the transmission processing unit 41B.

(Update Process 2)

When an entry matching the specified MAC address does not exist, an entry having the specified MAC address and TLS identifier as values is generated and added.

With this configuration, the TLS tunnel selection unit 34 updates the contents of entries included in the TLS identifier table based on the MAC address of the packet transmitted from the destination TLS termination point. Note that the term "update" as used herein includes changing of entry and adding of entry as described above. The contents of the entry may be updated by obtaining the contents of the entry by automatic learning, for example, in addition to the method described above.

After performing the transmission process 1 or the transmission process 2, the transmission processing unit 41B transfers the transmission Ethernet frame to the transmission FIFO 43B, and enqueues the transmission Ethernet frame in the transmission queue 42B. For this purpose, the transmission processing unit 41B transmits a transmission queue setting signal S214 to the transmission queue 42B, and transmits a transmission FIFO write signal S215 to the transmission FIFO 43B.

The transmission queue setting signal S214 is a signal for enqueuing information related to the transmission Ethernet frame in the transmission queue 42B in order to transfer the transmission Ethernet frame, for which the transmission processing unit 41B has completed the transmission process, to the network interface processing unit 30A. The information related to the Ethernet frame includes the packet length of the Ethernet frame. The transmission queue setting signal S214 is output when the writing of transmission Ethernet frame, for which the transmission process is completed, into the transmission FIFO 43B is completed.

The transmission FIFO write signal S215 is a signal for writing a transmission Ethernet frame, which has been transmitted from the transmission processing unit 41B, into the transmission FIFO 43B, and indicates the contents of transmission packet data of the transmission Ethernet frame.

The transmission queue 42B stores information about a transmission Ethernet frame that is generated by the transmission processing unit 41B and transferred to the transmission FIFO 43B. The information about the Ethernet frame includes the frame length of Ethernet frame. The front entry in the transmission queue 42B is output to the network interface processing unit 30A. When the network interface processing unit 30A has completed receiving of the Ethernet frame, the contents of the next entry are output by reading out the transmission queue 42B. For this purpose, the transmission queue 42B outputs a transmission queue output signal S216 to the network interface processing unit 30A.

The transmission queue output signal S216 indicates the front entry enqueued in the transmission queue 42B. When the Ethernet frame that is to be transmitted by the network interface processing unit 30A is stored in the transmission FIFO 43B, the transmission queue output signal S216 also includes the frame length of the Ethernet frame. When the network interface processing unit 30A reads the transmission queue output signal S216, the transmission queue 42B outputs the next contents of the queue.

The transmission FIFO 43B is a packet storage FIFO for transferring the Ethernet frame generated by the transmission processing unit 41B to the network interface processing unit 30A. The Ethernet frame is written to the transmission FIFO 43B by the transmission processing unit 41B and is read out by the network interface processing unit 30A. For this purpose, the transmission FIFO 43B outputs a transmission FIFO read signal S217 to the network interface processing unit 30A.

The transmission FIFO read signal S217 is a signal that is output when the network interface processing unit 30A reads out an Ethernet frame stored in the transmission FIFO 43B in accordance with the information indicated in the transmission queue output signal S216, and outputs the contents of the Ethernet frame data.

The network interface processing unit 30A reads the Ethernet frame from the transmission FIFO 43A based on the information about the Ethernet frame enqueued in the transmission queue 42B, and transmits the Ethernet frame to the terminal device 12, which is the destination.

As described above, the secure relay device 18 of the present embodiment is connected to the terminal device 12 and establishes the TLS tunnel with another secure relay device 18 connected to another terminal device 12. Thus, the secure relay device 18 enables use of an address space outside the TLS termination point as the VPN address space. The secure relay device 18 of the present embodiment operates without being built into the terminal device 12. Thus, the terminal device 12 can achieve a stable VPN connection even though the terminal device 12 has low CPU capacity.

The secure relay device 18 of the present embodiment determines whether or not the destination IP address of the packet is the same network address as the IP address of the LAN.

When the packet is destined to a different network address, the secure relay device 18 selects a TLS tunnel established with a TLS termination point corresponding to the different network address, and transmits the packet through this TLS tunnel. This packet transmission and reception corresponds to the above-described L3 operation. When the packet is addressed to the same network address, the secure relay device 18 selects the TLS tunnel established with the TLS termination point corresponding to the destination MAC address of the packet, and transmits the packet through this TLS tunnel. This packet transmission and reception corresponds to the above-described L2 operation.

The secure relay device 18 of the present embodiment switches between L2 operation and L3 operation by determining whether the destination IP address of the packet is the same network address as the IP address of the LAN. Therefore, the secure relay device 18 of the present embodiment can transmit packets even when L2 configuration and L3 configuration are mixed with one another, thereby enabling transmission and reception of packet without changing the settings regardless of whether the terminal devices 12 are in the same network or in different networks.

As described in the reception process 2A and the reception process 3 executed by the reception processing unit 33A, when the secure relay device 18 of the present embodiment transmits a packet to a destination whose entry is not included in the TLS identifier table, or when the destination MAC address is a broadcast address, the secure relay device 18 selects, as the destination of the packet, a TLS tunnel at the TLS termination point having the same network address as the IP address of the LAN.

This configuration allows the secure relay device 18 to transmit a packet even though the destination of packet is not included in the TLS identifier table.

Although the present disclosure is described with the embodiment and modifications as described above, the technical scope of the present disclosure is not limited to the scope described in the embodiment and modifications described above. Various changes or improvements can be made to the above embodiment and modifications without departing from the spirit of the present disclosure, and other modifications or improvements are also included in the technical scope of the present disclosure.

In the above embodiment, the secure relay device 18 is connected to the terminal device 12 as a hardware circuit. However, the present disclosure is not limited to this configuration. For example, the functions of secure relay device 18 may be implemented in the terminal device 12 in software manner.

What is claimed is:

1. A secure relay device connected to a terminal device, the secure relay device configuring a termination point of a transport layer security (TLS) tunnel in a virtual private network (VPN) network performing data communication using a TLS tunnel, the secure relay device being configured to:

determine whether a destination internet protocol (IP) address of reception data, which is received from a local area network (LAN), is same as an IP address of the LAN for determining a destination TLS tunnel to which the reception data is to be transmitted;

when the reception data is destined to a different network address from the IP address of the LAN, execute a first process of selecting, as the destination TLS tunnel, the TLS tunnel established between a termination point corresponding to the different network address and a transmission source of the reception data; and when the reception data is destined to a same network address as the IP address of the LAN, execute a second process of selecting, as the destination TLS tunnel, the TLS tunnel established between a termination point corresponding to a destination media access control (MAC) addresses of the reception data and the transmission source of the reception data.

2. The secure relay device according to claim 1 being configured to determine, in the second process, the destination TLS tunnel by searching a table, which includes entries each having an identifier of the termination point associated with the destination MAC address.

3. The secure relay device according to claim 2, wherein contents of the entries included in the table are updated based on a MAC address of data transmitted from the termination point corresponding to the destination MAC address.

4. The secure relay device according to claim 2 being configured to select, as the destination TLS tunnel, the TLS tunnel of the termination point having the same network address as the IP address of the LAN when transmitting the reception data to a destination that is not included in the table as one of the entries or when the destination MAC address is a broadcast address.

5. The secure relay device according to claim 1 being configured by a hardware circuit.

6. A data transmission reception system comprising a plurality of the secure relay devices according to claim 1, wherein each of the plurality of the secure relay devices is connected to the corresponding terminal device, and one of the plurality of the secure relay devices establishes the TLS tunnel with another one of the plurality of secure relay devices and uses the established TLS tunnel to perform data transmission and data reception between one terminal device and another terminal device.

\* \* \* \* \*